(12) United States Patent
Huang et al.

(10) Patent No.: US 10,462,266 B2
(45) Date of Patent: Oct. 29, 2019

(54) DATA COMMUNICATION METHOD AND APPARATUS

(71) Applicant: Alibaba Group Holding Limited, Grand Cayman (KY)

(72) Inventors: Mian Huang, Hangzhou (CN); Yan Xu, Zhejiang (CN)

(73) Assignee: Alibaba Group Holding Limited, Grand Cayman (KY)

( * ) Notice: Subject to any disclaimer, the term of this patent is extended or adjusted under 35 U.S.C. 154(b) by 261 days.

(21) Appl. No.: 15/623,839

(22) Filed: Jun. 15, 2017

(65) Prior Publication Data

US 2017/0289315 A1 Oct. 5, 2017

Related U.S. Application Data

(63) Continuation of application No. PCT/CN2015/096798, filed on Dec. 9, 2015.

(30) Foreign Application Priority Data

Dec. 19, 2014 (CN) .......................... 2014 1 0800144

(51) Int. Cl.
*H04L 29/06* (2006.01)
*H04L 29/08* (2006.01)
*G06F 9/445* (2018.01)

(52) U.S. Cl.
CPC .......... *H04L 67/42* (2013.01); *G06F 9/44526* (2013.01); *H04L 29/08* (2013.01); *H04L 65/1069* (2013.01)

(58) Field of Classification Search
CPC .. G06F 9/44526; H04L 29/08; H04L 65/1069
See application file for complete search history.

(56) References Cited

U.S. PATENT DOCUMENTS

2010/0122271 A1   5/2010   Labour et al.
2012/0071230 A1   3/2012   Lagercrantz
(Continued)

FOREIGN PATENT DOCUMENTS

CN   101572631 A   11/2009
CN   102647398 A   8/2012
(Continued)

OTHER PUBLICATIONS

Translation of Chinese Office Action from corresponding CN Patent Application No. 201410800144.5, dated May 31, 2018, 9 pages.
(Continued)

*Primary Examiner* — Ranodhi Serrao
(74) *Attorney, Agent, or Firm* — Lee & Hayes, P.C.

(57) ABSTRACT

A data communication method includes: receiving a plugin execution instruction transmitted by a server according to a first channel, the plugin execution instruction being used to instruct to operate a target plugin; according to the plugin execution instruction, calling the target plugin to operate, and feeding back operation result data to the server via the first channel for processing, such that the server feeds back a processing result to a browser. The present disclosure realizes the compatibility of plugins with various browsers.

14 Claims, 7 Drawing Sheets

(56) References Cited

U.S. PATENT DOCUMENTS

| | | | | |
|---|---|---|---|---|
| 2014/0006979 A1* | 1/2014 | Venkatesh | ............... | G06F 3/048 |
| | | | | 715/760 |
| 2014/0053062 A1* | 2/2014 | Cahill | ................ | G06F 17/2247 |
| | | | | 715/234 |
| 2015/0179023 A1 | 6/2015 | Lagercrantz | | |

FOREIGN PATENT DOCUMENTS

| | | | |
|---|---|---|---|
| CN | 103365907 A | 10/2013 | |
| CN | 104038536 A | 9/2014 | |
| EP | 2736281 A1 | 5/2014 | |
| JP | 2002366361 | 12/2002 | |
| JP | 2011502291 | 1/2011 | |
| JP | 2013206283 | 10/2013 | |

OTHER PUBLICATIONS

Translation of Chinese Office Action from corresponding CN Patent Application No. 201410800144.5, dated May 17, 2018, 2 pages.
Extended European Search Report dated Jun. 1, 2018, for European Application No. 15869248.3, 7 pages.
Translation of International Search Report from corresponding PCT Application No. PCT/CN2015/096798, dated Mar. 10, 2016, 2 pages.
Translation of Written Opinion from corresponding PCT Application No. PCT/CN2015/096798, dated Mar. 10, 2016, 6 pages.

* cited by examiner

DATA COMMUNICATION METHOD AND APPARATUS

CROSS REFERENCE TO RELATED PATENT APPLICATIONS

This application claims priority to and is a continuation of PCT Patent Application No. PCT/CN2015/096798, filed on 9 Dec. 2015, which claims priority to Chinese Patent Application No. 201410800144.5, filed on 19 Dec. 2014, entitled "DATA COMMUNICATION METHOD AND APPARATUS," which are hereby incorporated by reference in their entirety.

TECHNICAL FIELD

The present disclosure relates to Internet technologies, and, in particular, to a data communication method and apparatus.

BACKGROUND

A plugin is a program written by an Application Programming Interface (API) following a certain specification, for enhancing or expanding software functions. Many kinds of client terminal software also need plugins for normal running. For example, when a certain webpage is run in a browser, generally, the webpage can run normally only when the browser calls and executes a related plugin. Therefore, a plugin needs to follow the API specification specified by the browser during development, and then the browser can call the plugin. However, with continuous development of browser technology, lots of browsers begin to employ their respective private plugin specifications. Even if for plugins having a same function, application manufacturers have to develop plugin versions corresponding to different browsers respectively, and the work load is huge.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides a data communication method and apparatus, which are directed to implementing compatibility of a plugin with various browsers.

For example, the present disclosure is implemented through the following technical solutions:

In an aspect, a data communication data is provided, the method including:

receiving a request of accessing a target page sent by a browser;

establishing a second channel with the browser, establishing a first channel with client terminal software, and storing a corresponding relationship between the first channel and the second channel;

sending a plugin execution instruction to the client terminal software through the first channel, the plugin execution instruction being used for instructing the client terminal software to run a target plugin, and instructing, through the second channel, the browser to process other page functions of the target page;

receiving plugin running result data fed back through the first channel by the client terminal software;

processing the running result data; and sending the processing result to the browser through the second channel.

In an aspect, a data communication method is provided, the method including:

receiving a plugin execution instruction sent through a first channel by a server, the plugin execution instruction being used for instructing to run a target plugin;

calling, according to the plugin execution instruction, the target plugin to run; and feeding back running result data, through the first channel, to the server for processing, so that the server feeds back the processing result to the browser.

In an aspect, a data communication apparatus is provided, the apparatus including:

an access request receiving unit configured to receive a request of accessing a target page sent by a browser;

a channel establishment unit configured to establish a second channel with the browser, establish a first channel with client terminal software, and store a corresponding relationship between the first channel and the second channel;

an instruction sending unit configured to send a plugin execution instruction to the client terminal software through the first channel, the plugin execution instruction being used for instructing the client terminal software to run a target plugin, and instructing, through the second channel, the browser to process other page functions of the target page;

a feedback receiving unit configured to receive plugin running result data fed back through the first channel by the client terminal software;

a data processing unit configured to process the running result data; and a result forwarding unit configured to send the processing result to the browser through the second channel.

In an aspect, a client terminal apparatus is provided, the apparatus including:

an instruction receiving unit configured to receive a plugin execution instruction sent through a first channel by a server, the plugin execution instruction being used for instructing to run a target plugin;

a plugin processing unit configured to call, according to the plugin execution instruction received by the instruction receiving unit, the target plugin to run; and a result feedback unit configured to feed back running result data, through the first channel, to the server for processing, such that the server feeds back the processing result to the browser.

In another aspect, the present disclosure also provides an apparatus comprising:

one or more processors; and one or more memories stored thereon computer-readable instructions that, when executed by the one or more processors, cause the one or more processors to perform acts comprising:

receiving a request of accessing a target page sent by a browser;

establishing a first channel with client terminal software;

establishing a second channel with the browser;

storing a corresponding relationship between the first channel and the second channel;

sending a plugin execution instruction to the client terminal software through the first channel, the plugin execution instruction being used for instructing the client terminal software to run a target plugin;

instructing, through the second channel, the browser to process other page functions of the target page.

receiving plugin running result data fed back through the first channel by the client terminal software;

processing the running result data; and sending the processing result to the browser through the second channel.

For example, the storing the corresponding relationship between the first channel and the second channel includes receiving a channel establishment request sent by the client terminal software, the channel establishment request carrying a channel identifier; and establishing the corresponding relationship between the first channel and the second channel according to the channel identifier.

For example, the acts may further comprise:

receiving communication data sent by the browser; and forwarding the communication data to the client terminal software.

For example, the acts may further comprise:

receiving a plugin execution instruction sent through a first channel by a server, the plugin execution instruction being used for instructing to run a target plugin;

calling, according to the plugin execution instruction, the target plugin to run; and feeding back running result data, through the first channel, to the server for processing.

For example, the acts may further comprise receiving processing result from the server to the browser.

For example, before the receiving the plugin execution instruction sent through the first channel by the server, the acts may further comprise:

monitoring a communication between the browser and the server, to acquire channel information and a channel identifier of a second channel allocated by the server to the browser; and sending a channel establishment request to the server according to the channel information, the channel establishment request carrying a channel identifier.

For example, the channel information includes a server address. For example, the channel information may further include a server port.

The data communication method and apparatus according to the example embodiments of the present disclosure call and execute a plug-in by client terminal software, so that the client terminal software may execute the plugin on its own even if the browser cannot run the plugin, thus implementing compatibility of the plugin with various browsers.

DETAILED DESCRIPTION

The data communication method according to the example embodiments of the present disclosure is applicable to a scenario where client terminal software requires a plugin to assist in running. It should be noted that the method is also applicable to extension, controls and other programs for expanding software functions. A plugin is taken as an example in the following example embodiments.

Figure 1:
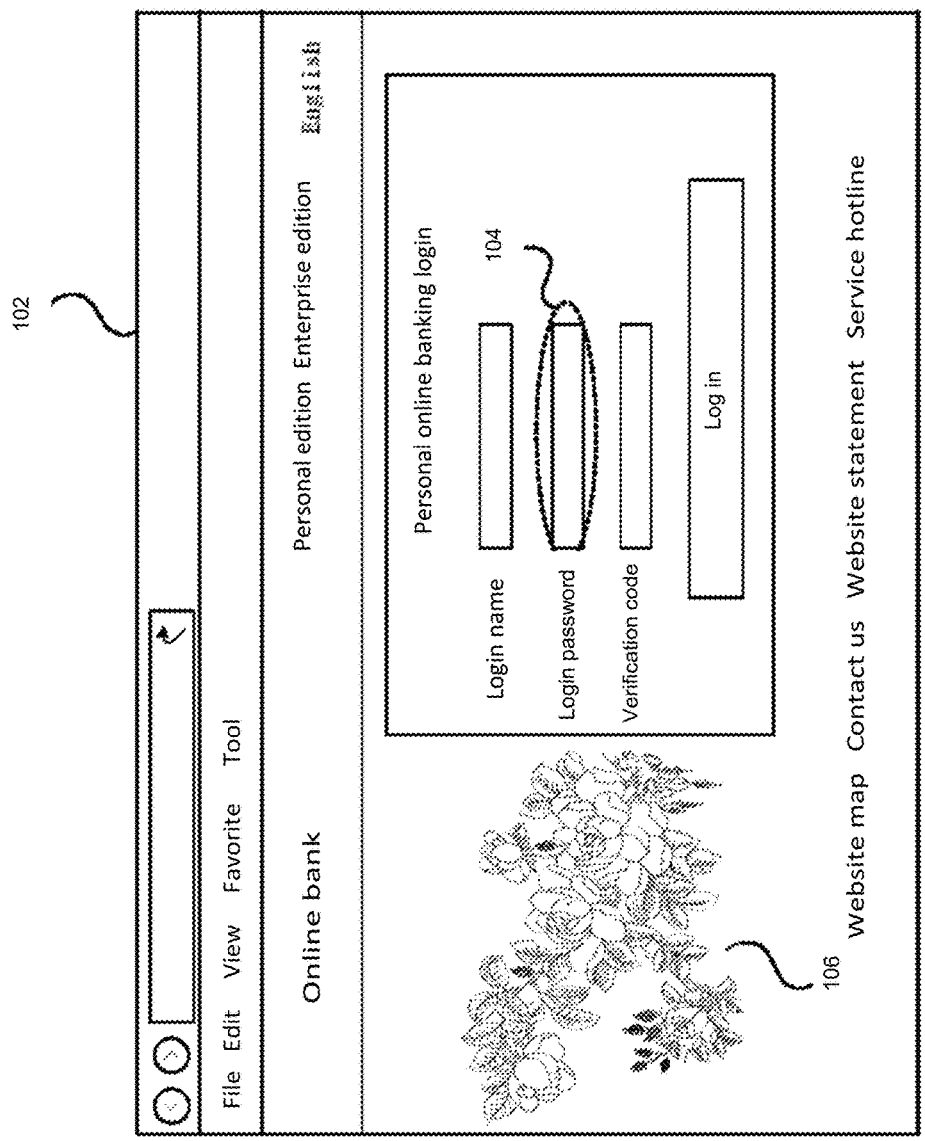
FIG. 1 is an application scenario of a data communication method according to an example embodiment of the present disclosure.

FIG. 1 illustrates an application scenario of the data communication method. (The described method is not limited to the application scenario, and other similar applications may employ the described method according to the embodiment of the present disclosure.) Suppose that it is necessary to open a webpage by using a browser 102 (the browser may be any browser such as Firefox or IE) when client terminal software is running, and in this example embodiment, an "online bank" that is run in the browser 102 is taken as an example. In the process of using the online bank, a password may need to be input. FIG. 1 illustrates a page where a password needs to be input. The page may be referred to as a "target page". In the page, it is assumed that a login password input area indicated by an elliptical box 104 is managed by a password control, the password input field is normally displayed in the page of FIG. 1 and a password input by a user is received only if the password control is run (setting the control is generally for ensuring security of the password). In this example embodiment, the password control is referred to as a "target plugin", i.e., running of the target page shown in FIG. 1 requires a target plugin, and only by running the target plugin, may the function of inputting the corresponding password in the target page be normally executed.

Figure 2:
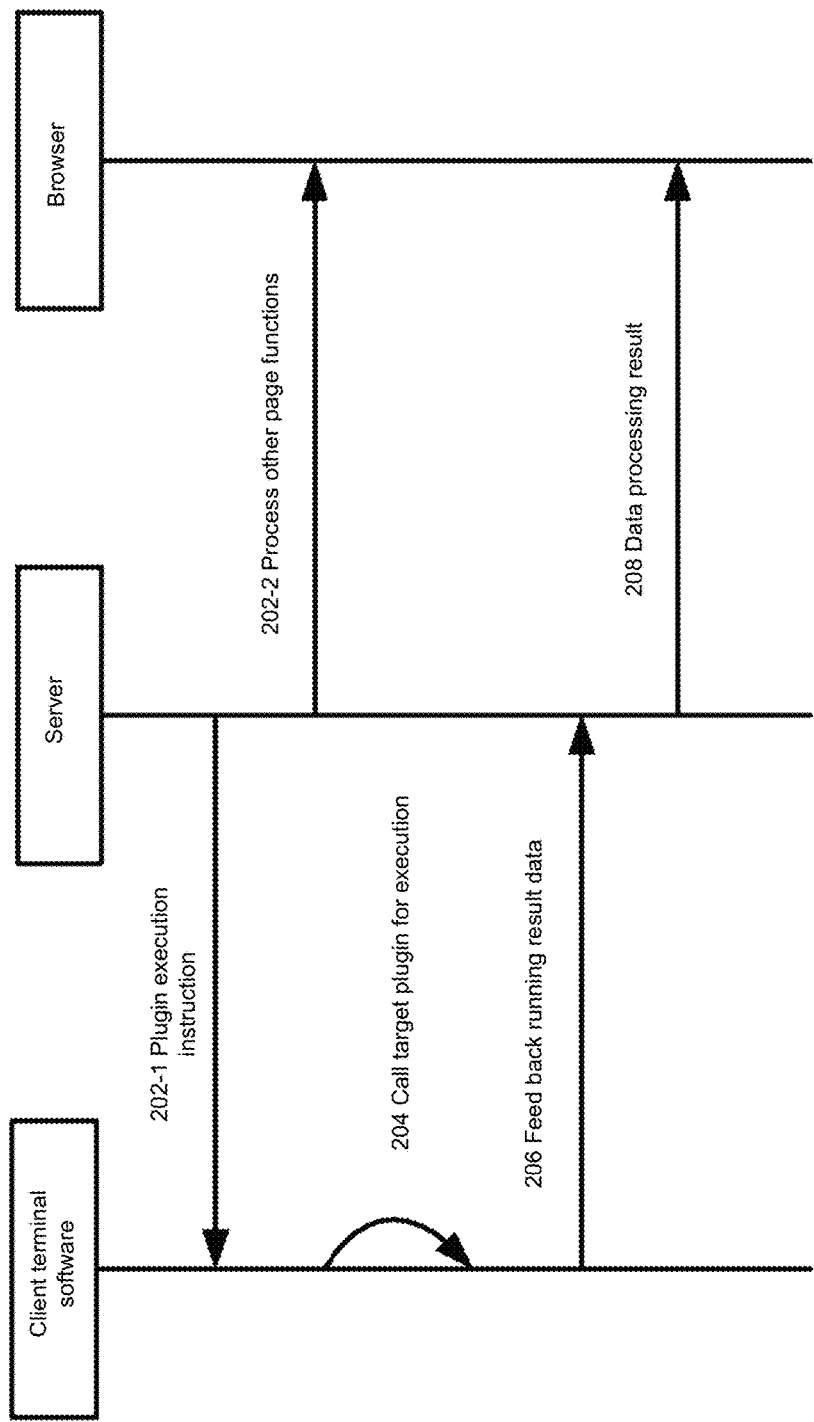
FIG. 2 is a flowchart of a data communication method according to an example embodiment of the present disclosure.

In a conventional way, the target plugin is called and executed by the browser 102, so that a page area corresponding to the plugin is normally run. The data communication method of this example embodiment will describe how the target page in FIG. 1 is normally run in a situation that the target plugin is not in line with the plugin specification of the browser 102, and at this point, the browser 102 cannot call the target plugin. FIG. 2 illustrates the process of the method:

202. At 202-1, A server sends a plugin execution instruction to client terminal software through a first channel, the plugin execution instruction being used for instructing to run a target plugin; and, at 202-2, instructs, through a second channel corresponding to the first channel, a browser to process other page functions of a target page.

Wherein, the server, when receiving a request of accessing the target page sent by the browser, establishes the first channel with the client terminal software, establishes the second channel with the browser, and stores a corresponding relationship between the first channel and the second channel.

204. The client terminal software calls, according to the plugin execution instruction, the target plugin to run.

206. The client terminal software feeds back running result data, through the first channel, to the server for processing.

208. The server processes the running result data, and sends the processing result, through the second channel, to the browser.

For example, the process shown in FIG. 2 is described more specifically in the following. At first, in order to make the data communication method according to the example embodiment of the present disclosure easy to understand, the principle of the method is simply illustrated with FIG. 3, wherein the online bank client terminal shown in FIG. 1 is still taken as an example, the browser is equivalent to a tool responsible for page parsing and display, and the server is an online bank server corresponding to the online bank.

Figure 3:
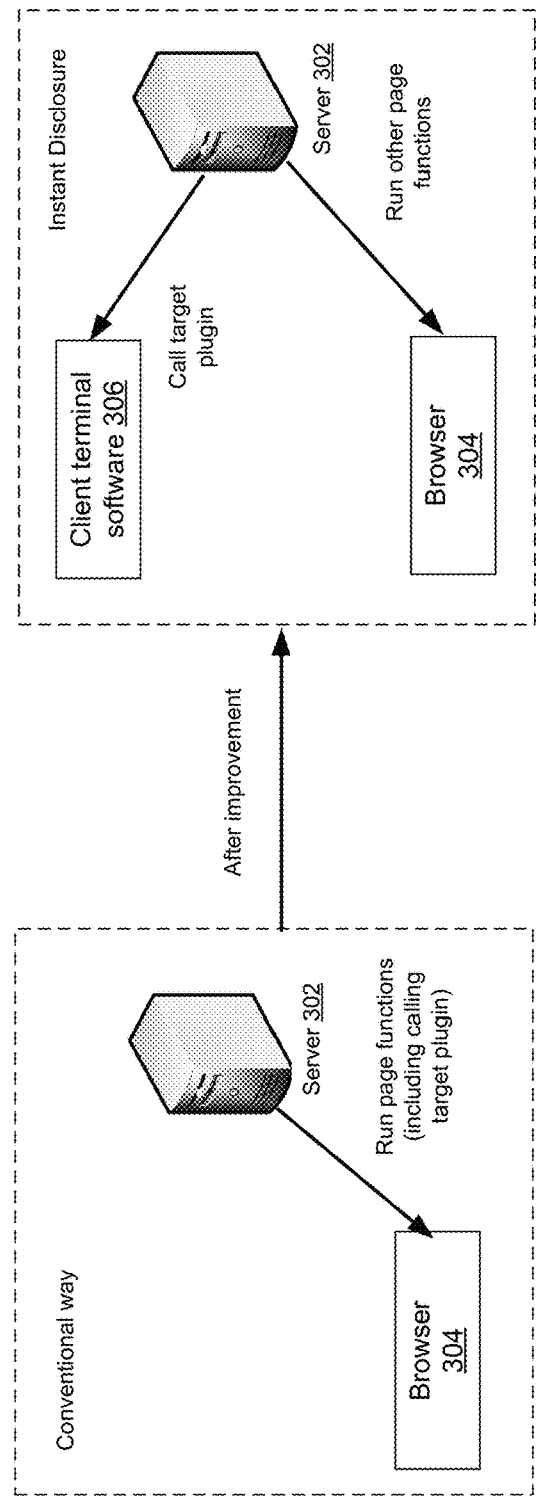
FIG. 3 is a schematic diagram of the principle of a data communication method according to an example embodiment of the present disclosure.

When the target page shown in FIG. 1 is displayed, the server sends a processing instruction to the browser, carrying page file data of the target page to be displayed by the browser. The browser, upon receipt of the data, parses the webpage syntax through a browser kernel, and renders and presents the target page. Referring to FIG. 3, in a conventional way, for a page requiring a plugin to assist, the server 302, when sending the processing instruction to the browser 304, may also instruct the browser 304 to call a target plugin at the same time. In this way, the complete target page of FIG. 1 can be displayed. However, for a situation where the plugin is not in line with the API specification of the browser, it is necessary to employ the manner in the example embodiment of the present disclosure, and the server may instruct the client terminal software to accomplish a task of calling and running the plugin, which is equivalent to that the client terminal software executes the task in place of the browser.

For example, with reference to FIG. 1 and FIG. 3, in the target page shown in FIG. 1, the page function may be divided into two parts. The first part is a page function corresponding to the elliptical box 104, and this part displays the input field and receive a password input by a user only by running the target plugin. The second part is other page functions, for example, the display toolbar "file, edit, favorite and so on" shown in FIG. 1, and other page content such as a picture 106 in a display page. Such functions are functions that are implemented by the browser without relying on the target plugin. Based on this, the server, when instructing to run of the target page, would give instructions separately. As shown in FIG. 3, the server 302 instructs the client terminal software 306 to run the target plugin, and still instructs the browser 304 to run other page content.

It should be noted that, although the server instructs two parts of the target page to run separately, the server records a corresponding relationship of the two parts therein, for example, "a page part corresponding to the target plugin run by the client terminal software is a part of the target page run by the browser". Moreover, the client terminal software, after running the plugin to receive the password input by the user, would transmit the password to the server, and the server, after processing the password (such as password verification), may instruct the browser to display "login succeeds", thus associating the two parts together.

The general principle of the data communication method is simply described above. On this basis, a process of establishing a connection between the client terminal software and the browser as well as the server shown in FIG. 3 and an interaction procedure in page display are described in detail as follows, including:

In this example embodiment, the client terminal software may monitor network communication, and, for example, monitors communication between the browser and the server. For example, a website of an online bank is opened in an IE browser, the process of opening the page of the online bank (at this point, it is assumed that the page is a page that does not require running of a plugin, for example, the home page) requires the browser to communicate with the online bank server, and the browser sends a request of accessing the page (the page may be referred to as the target page). At the same time, the client terminal software may monitor the process of communication between the browser and the server.

For example, the browser is a browser that supports HTML5, when the server returns page data to the browser, the page data includes a piece of HTML5 code of a Web Socket, and the browser, after parsing the page, establishes a connection with the server by using the Web Socket. The Web Socket is a protocol of the HTML5, which implements full-duplex communication between the browser and the server. The browser sends a channel acquisition request to the server by using the Web Socket, and the server, after receiving the request, allocates channel information and a channel identifier to the browser. The channel information, for example, includes: a server address and a server port. The channel identifier, for example, is a Key. In this example embodiment, the channel between the browser and the server may be referred to as a second channel, represented by L2, and the Key allocated to the channel by the server is referred to as K2. The server may feed back the information to the browser periodically.

The client terminal software, in the process of monitoring the communication between the browser and the server, may acquire the channel information and the channel identifier. For example, the client terminal software may acquire the address and the port of the server. The client terminal software would actively send, according to the channel information, a channel establishment request to the server, to request the server to allocate a channel of connection with the client terminal software. Moreover, the client terminal software may carry the channel identifier K2 in the request.

The server, after receiving the request of the client terminal software, would establish a channel of connection with the client terminal software, which is referred to a first channel in this example embodiment and may be represented by L1. Moreover, the server determines, according to the channel identifier K2 carried in the request sent by the client terminal software, that the first channel corresponds to the second channel, and establishes a corresponding relationship between the first channel and the second channel. The server may record information similar to those in the following Table 1, record a mapping relationship among the first channel, the second channel and the channel identifier, or only record a corresponding relationship between the second channel and the channel identifier:

TABLE 1

| First channel | Channel identifier | Second channel |
|---|---|---|
| L1 | K2 | L2 |

No matter which recording manner of the corresponding relationship it is, the server needs to obtain a binding relationship between the first channel and the second channel in a subsequent process of page processing, because the server further needs to be responsible for data forwarding between the client terminal software and the browser, and running data after the client terminal software runs the plugin needs to be fed back to the browser by the server, which belongs to association between some functions of a same page. Reference may be made to the subsequent example embodiment parts.

In addition, it should be noted that the server may know the effect of requesting creating a first channel by the client terminal software. The effect is as follows: when it is necessary to run a page plugin, the server instructs, through the first channel, the client terminal software to call the plugin, but no longer instructs the browser to call the plugin. The manner that the server obtains the effect may be set flexibly. For example, it is possible to carry an identifier, for instructing the effect, in the channel establishment request sent by the client terminal software, or it is also possible to preset at the side of the server that receiving the request for establishing a channel from the client terminal software is used for the above effect.

Next, after the server has created the first channel and the second channel and recorded the corresponding relationship between the first channel and the second channel, the server still resumes processing running control of the client terminal software. Which page is displayed by the client terminal software in which step of the running process is controlled by the server. The server instructs the browser to display the page, and the browser parses and displays the page according to the instruction of the server.

Similarly, for the target page shown in FIG. 1, it is assumed that, at a certain time, the server detects that what to be performed in the next step is displaying the target page, and the target page needs to run a target plugin. Then, the server may send, through the first channel, a plugin execution instruction to the client terminal software. The instruction is used for instructing to run a target plugin, and may carry a plugin identifier of the target plugin, so that the client terminal software finds, according to the plugin identifier, the plugin for calling. With respect to display of other page parts in the target page, the display is still processed by the browser, and the server sends, through the second channel, data of the other page parts to the browser and instructs the browser to process.

For example, the browser, after receiving the page data sent by the server, performs parsing and display, for example, the browser displays page content outside the password input field in FIG. 1, such as a page toolbar and an in-page pattern. After receiving the instruction of the server, the client terminal software finds, according to the plugin identifier, a corresponding plugin for calling and execution, and by executing the plugin, causes the password input field to be displayed normally and to be capable of receiving the password input by the user. It should be noted that the target plugin executed by the client terminal software may be already installed, the target plugin is pre-defined in a configuration file of the client terminal software, and the client terminal software knows the installation position of the plugin and acquires, from the installation position, plugin data for execution.

The client terminal software, after running the target plugin, further needs to feed back, through the first channel, running result data to the server for processing. For example, the client terminal software, after running the plugin, displays the password input field and receives the password input by the user, and the client terminal software transmits, through the first channel, received password data to the server. The server may process the password data such as perform password verification to verify whether the password is correct. If the verification is passed, a prompt such as "verification is passed" or "login succeeds" is displayed on the target page. For example, the server, after verifying that the password is correct, may notify the browser to display a successful login on the target page. The instruction displayed on the page of successful login is equivalent to feeding back the processing result of the password data to the client terminal software.

For example, the server may associate the client terminal software and the browser in the following manner: in the above process, the client terminal software would also send K2 when sending the password data to the server through the first channel, and the K2 is acquired when the client terminal software monitors network communication. When the verification is passed, the server finds the second channel L2 corresponding to the K2 according to the K2 and the corresponding relationship recorded previously, for example, Table 1, and instructs, through the L2, the browser to display information indicating that login succeeds.

In addition, it can be seen through the above process that the data communication method is similar to communication between the client terminal software and the browser. For example, after the client terminal software executes a plugin program, the server performs processing according to running data of the client terminal software, and feeds back the processing result to the browser for display. That is, a display of the browser is obtained in combination with a running result of the plugin at the side of the client terminal software, which is equivalent to that the server transfers the data of the client terminal software to the browser. On the contrary, when the browser needs to communicate with the client terminal software, the request may be transferred through the server, that is, the request is sent to the server through the second channel, and then the server sends the request to the client terminal software, thus implementing two-way communication between the client terminal software and the browser.

According to the data communication method of this example embodiment, a same plugin is applicable to a variety of browsers, and developers no longer need to develop plugin versions in line with various browser specifications, as long as the client terminal software can call and execute the plugin. Compared with the conventional way, the work load of plugin developers is reduced significantly. Moreover, the method also improves the efficiency of service implementation. For example, when certain client terminal software needs to be upgraded, it is not necessary to develop plugins of multiple versions, upgrading of the client terminal software can be implemented quickly, and the efficiency is improved.

Figure 4:
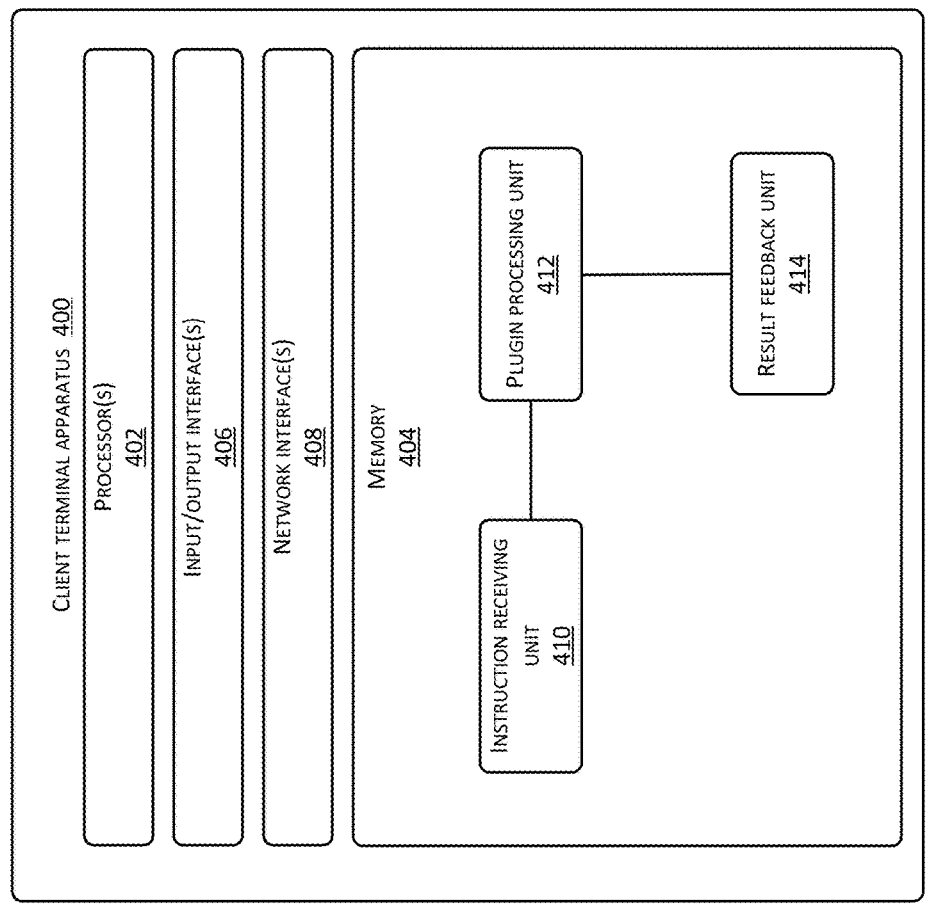
FIG. 4 is a schematic structural diagram of a client terminal apparatus according to an example embodiment of the present disclosure.

Based on the above method example embodiment, an example embodiment of the present disclosure provides a client terminal apparatus. The apparatus is run at client terminal software, so that the client terminal software performs the method in the above method example embodiment. In this example embodiment, the structure of the apparatus is briefly described, and reference may be made to the method example embodiment for working principles of respective modules thereof. As shown in FIG. 4, a client terminal apparatus 400 includes one or more processor(s) 402 or data processing unit(s) and memory 404. The client terminal apparatus 400 may further include one or more input/output interface(s) 406, and network interface(s) 408. The memory 404 is an example of computer readable media.

The computer readable media include volatile and non-volatile, removable and non-removable media, and can use any method or technology to store information. The information may be a computer readable instruction, a data structure, and a module of a program or other data.

Examples of storage media of a computer include, but are not limited to, a phase change memory (PRAM), a static random access memory (SRAM), a dynamic random access memory (DRAM), other types of RAMs, an ROM, an electrically erasable programmable read-only memory (EEPROM), a flash memory or other memory technologies, a compact disk read-only memory (CD-ROM), a digital versatile disc (DVD) or other optical storage, a cassette tape, a tape disk storage or other magnetic storage devices, or any other non-transmission media, which can be that storing information accessible to a computation device. According to the definition herein, the computer readable media does not include transitory computer readable media (transitory media), for example, a modulated data signal and a carrier.

The memory 404 may store therein a plurality of modules or units including: an instruction receiving unit 410, a plugin processing unit 412 and a result feedback unit 414; wherein:

the instruction receiving unit 410 is configured to receive a plugin execution instruction sent through a first channel by a server, the plugin execution instruction being used for instructing to run a target plugin;

the plugin processing unit 412 is configured to call, according to the plugin execution instruction received by the instruction receiving unit, the target plugin to run; and the result feedback unit 414 is configured to feed back running result data, through the first channel, to the server for processing, such that the server feeds back the processing result to the browser.

Figure 5:
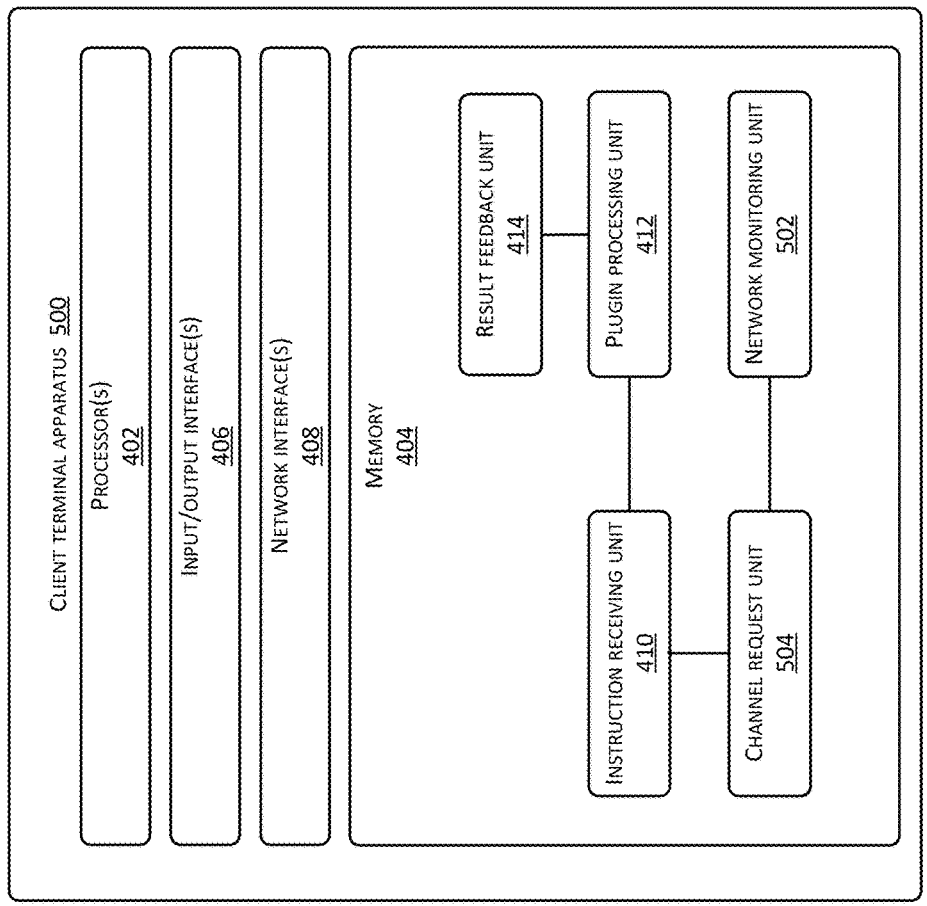
FIG. 5 is a schematic structural diagram of another client terminal apparatus according to an example embodiment of the present disclosure.

On the basis of FIG. 4, this example embodiment further provides another apparatus of FIG. 5, wherein, based on the client terminal apparatus 400, a client terminal apparatus 500 further includes: a network monitoring unit 502 and a channel request unit 504.

The network monitoring unit 502 is configured to monitor communication between the browser and the server, to acquire channel information and a channel identifier of a second channel allocated by the server to the browser.

The channel request unit 504 is configured to send a channel establishment request to the server according to the channel information acquired by the network monitoring unit, the channel establishment request carrying a channel identifier, such that the server creates the first channel, and establishes a corresponding relationship between the first channel and the second channel according to the channel identifier.

Figure 6:
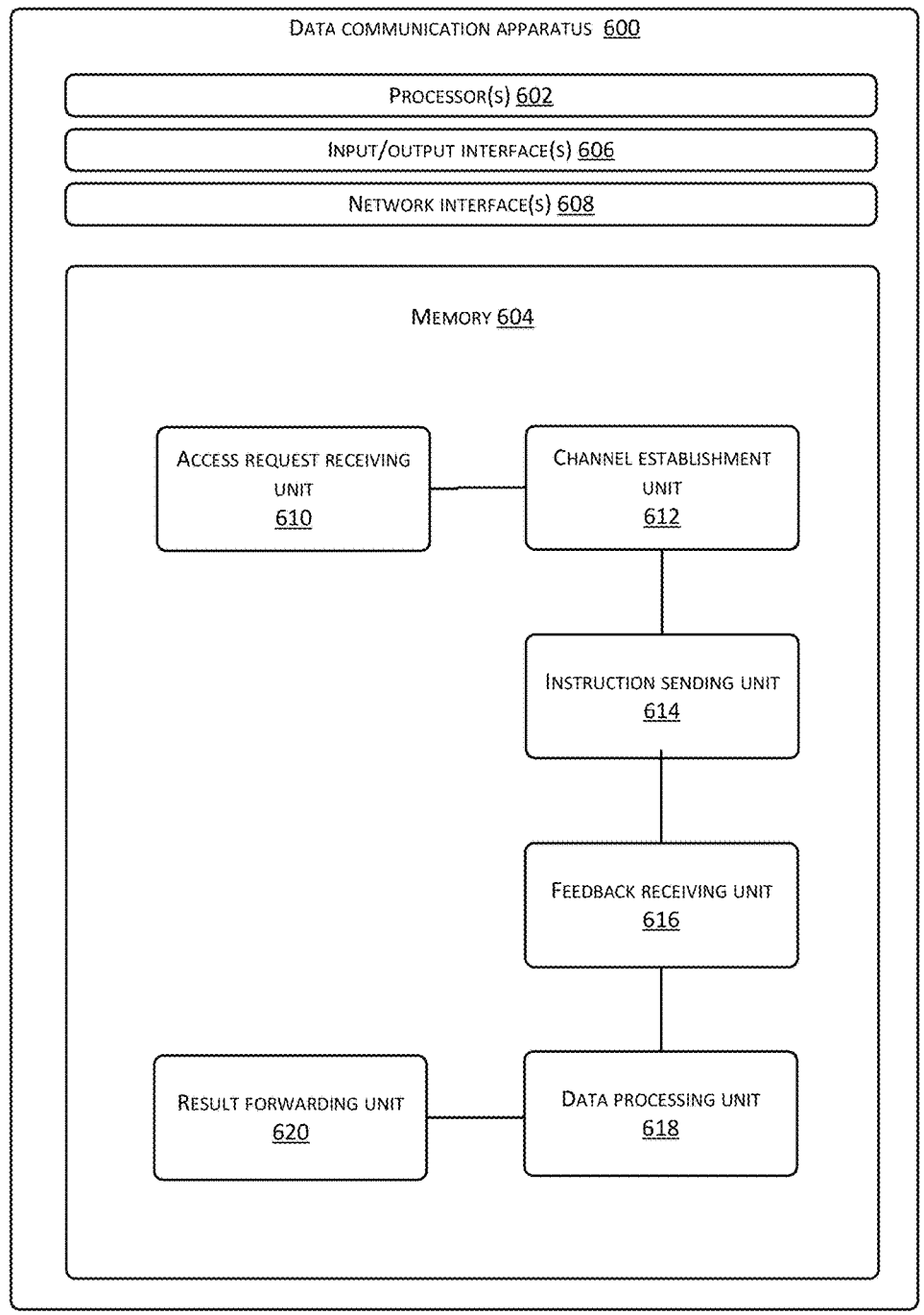
FIG. 6 is a schematic structural diagram of a data communication apparatus according to an example embodiment of the present disclosure.

An example embodiment of the present disclosure further provides a data communication apparatus. The data communication apparatus is run at a server, such that the server performs the above method. As shown in FIG. 6, a data communication apparatus 600 includes one or more processor(s) 602 or data processing unit(s) and memory 604. The data communication apparatus 600 may further include one or more input/output interface(s) 606, and network interface(s) 608. The memory 604 is an example of computer readable media.

The memory 604 may store therein a plurality of modules or units including: an access request receiving unit 610, a channel establishment unit 612, an instruction sending unit 614, a feedback receiving unit 616, a data processing unit 618 and a result forwarding unit 620; wherein, the access request receiving unit 610 is configured to receive a request of accessing a target page sent by a browser;

the channel establishment unit 612 is configured to establish a second channel with the browser, establish a first channel with client terminal software, and store a corresponding relationship between the first channel and the second channel;

the instruction sending unit 614 is configured to send a plugin execution instruction to the client terminal software through the first channel, the plugin execution instruction being used for instructing the client terminal software to run a target plugin, and instructing, through the second channel, the browser to process other page functions of the target page;

the feedback receiving unit 616 is configured to receive plugin running result data fed back through the first channel by the client terminal software;

the data processing unit 618 is configured to process the running result data; and the result forwarding unit 620 is configured to send the processing result to the browser through the second channel.

Figure 7:
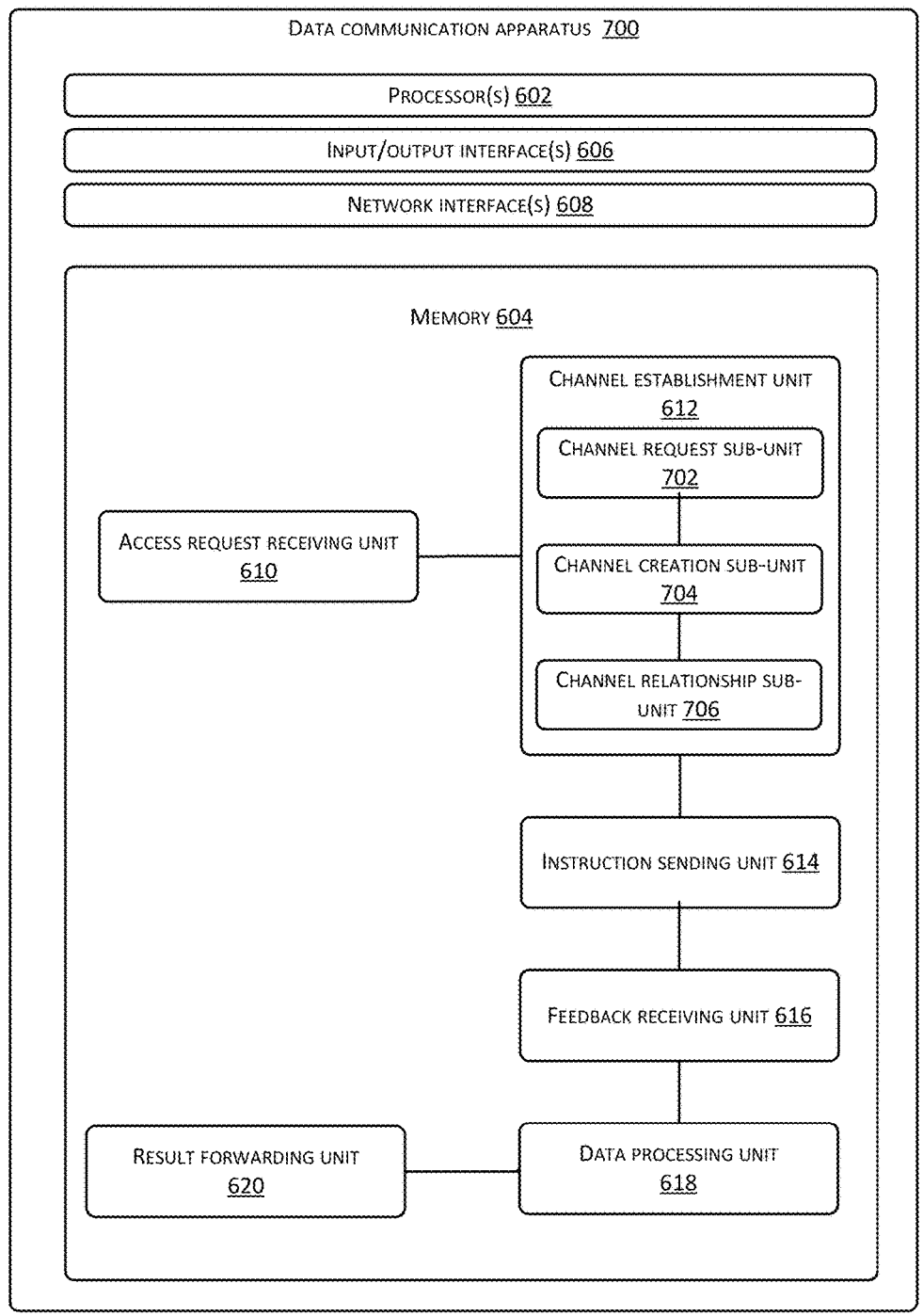
FIG. 7 is a schematic structural diagram of another data communication apparatus according to an example embodiment of the present disclosure.

On the basis of FIG. 6, this example embodiment further provides another apparatus of FIG. 7, wherein, in a data communication apparatus 700, the channel establishment unit 612 may include: a channel request sub-unit 702, a channel creation sub-unit 704 and a channel relationship sub-unit 706, wherein, the channel request sub-unit 702 is configured to receive a channel establishment request sent by the client terminal software, the channel establishment request carrying a channel identifier;

the channel creation sub-unit 704 is configured to create the first channel according to the channel establishment request; and the channel relationship sub-unit 706 is configured to establish the corresponding relationship between the first channel and the second channel according to the channel identifier.

The above descriptions are merely example embodiments of the present disclosure, which are not intended to limit the present disclosure. Any modification, equivalent replacement, improvement and the like made within the spirit and principle of the present disclosure should all be included in the protection scope of the present disclosure.

What is claimed is:

1. A method comprising:
   receiving a request of accessing a target page sent by a browser;
   establishing a first channel with client terminal software;
   establishing a second channel with the browser;
   storing, by a server, a corresponding relationship between the first channel and the second channel, wherein the storing the corresponding relationship between the first channel and the second channel includes receiving a channel establishment request sent by the client terminal software, the channel establishment request carrying a channel identifier;
   sending a plugin execution instruction to the client terminal software through the first channel, the plugin execution instruction being used for instructing the client terminal software to run a target plugin;
   instructing, through the second channel, the browser to process other page functions of the target page;
   receiving plugin running result data fed back through the first channel by the client terminal software;
   processing the running result data; and
   sending the processing result to the browser through the second channel.

2. The method of claim 1, wherein the storing the corresponding relationship between the first channel and the second channel further includes:

establishing the corresponding relationship between the first channel and the second channel according to the channel identifier.

3. The method of claim 1, further comprising:
receiving communication data sent by the browser; and
forwarding the communication data to the client terminal software.

4. The method of claim 1, wherein the plugin execution instruction carries a plugin identifier of the target plugin.

5. A method comprising:
receiving a plugin execution instruction sent through a first channel by a server, the plugin execution instruction being used for instructing to run a target plugin;
calling, according to the plugin execution instruction, the target plugin to run;
feeding back running result data, through the first channel, to the server for processing; and
receiving processing result, through a second channel, from the server to a browser;
monitoring a communication between the browser and the server, to acquire channel information and a channel identifier of the second channel allocated by the server to the browser; and
sending a channel establishment request to the server according to the channel information, the channel establishment request carrying a channel identifier;
wherein a corresponding relationship between the first channel and the second channel is stored by the server; and
wherein the server creates the first channel, and establishes the corresponding relationship between the first channel and the second channel according to the channel identifier.

6. The method of claim 5, wherein the channel information includes a server address and a server port.

7. An apparatus comprising:
one or more processors; and
one or more memories stored thereon computer-readable instructions that, when executed by the one or more processors, cause the one or more processors to perform acts comprising:
receiving a request of accessing a target page sent by a browser;
establishing a first channel with client terminal software;
establishing a second channel with the browser;
storing, by a server, a corresponding relationship between the first channel and the second channel, wherein the storing by the server the corresponding relationship between the first channel and the second channel includes receiving a channel establishment request sent by the client terminal software, the channel establishment request carrying a channel identifier;
sending a plugin execution instruction to the client terminal software through the first channel, the plugin execution instruction being used for instructing the client terminal software to run a target plugin;
instructing, through the second channel, the browser to process other page functions of the target page;
receiving plugin running result data fed back through the first channel by the client terminal software;
processing the running result data; and
sending the processing result to the browser through the second channel.

8. The apparatus of claim 7, wherein the storing the corresponding relationship between the first channel and the second channel further includes establishing the corresponding relationship between the first channel and the second channel according to the channel identifier.

9. The apparatus of claim 7, wherein the acts further comprise:
receiving communication data sent by the browser; and
forwarding the communication data to the client terminal software.

10. The apparatus of claim 7, wherein the acts further comprise:
receiving a plugin execution instruction sent through a first channel by a server, the plugin execution instruction being used for instructing to run a target plugin;
calling, according to the plugin execution instruction, the target plugin to run; and
feeding back running result data, through the first channel, to the server for processing.

11. The apparatus of claim 10, wherein the acts further comprise receiving processing result from the server to the browser.

12. The apparatus of claim 11, wherein, before the receiving the plugin execution instruction sent through the first channel by the server, the acts further comprise:
monitoring a communication between the browser and the server, to acquire channel information and a channel identifier of a second channel allocated by the server to the browser; and
sending a channel establishment request to the server according to the channel information, the channel establishment request carrying a channel identifier.

13. The apparatus of claim 11, wherein the channel information includes a server address.

14. The apparatus of claim 13, wherein the channel information further includes a server port.

* * * * *